(12) United States Patent
Yoshioka

(10) Patent No.: US 8,666,797 B2
(45) Date of Patent: Mar. 4, 2014

(54) INFORMATION COLLECTION PROGRAM, INFORMATION COLLECTION APPARATUS, AND INFORMATION COLLECTION METHOD

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 18 days.

(21) Appl. No.: 12/411,596

(22) Filed: Mar. 26, 2009

(65) Prior Publication Data

US 2009/0182603 A1    Jul. 16, 2009

Related U.S. Application Data

(63) Continuation of application No. PCT/JP2006/320577, filed on Oct. 16, 2006.

(51) Int. Cl.
*G06Q 10/00* (2012.01)

(52) U.S. Cl.
USPC ....... 705/7.29; 705/7.12; 705/7.25; 705/26.1; 707/748

(58) Field of Classification Search
USPC ............... 705/7.12, 7.25, 7.29, 26.1; 707/748
See application file for complete search history.

(56) References Cited

U.S. PATENT DOCUMENTS

| | | | | |
|---|---|---|---|---|
| 6,092,052 | A * | 7/2000 | Ziarno ........................... | 705/21 |
| 6,334,059 | B1 * | 12/2001 | Stilp et al. .................. | 455/404.2 |
| 6,721,465 | B1 * | 4/2004 | Nakashima et al. .......... | 382/318 |
| 6,862,711 | B1 * | 3/2005 | Bahrs et al. .................. | 715/205 |
| 6,970,434 | B1 * | 11/2005 | Mahany et al. ............... | 370/256 |
| 7,124,101 | B1 * | 10/2006 | Mikurak .......................... | 705/35 |
| 7,188,151 | B2 * | 3/2007 | Kumar et al. ................. | 709/217 |
| 7,225,156 | B2 * | 5/2007 | Fisher et al. .................... | 705/50 |
| 7,337,472 | B2 * | 2/2008 | Olsen et al. ...................... | 726/26 |
| 7,624,408 | B2 * | 11/2009 | Toguri ............................. | 725/34 |
| 7,660,581 | B2 * | 2/2010 | Ramer et al. ............... | 455/432.3 |
| 2002/0016921 | A1 * | 2/2002 | Olsen et al. .................... | 713/200 |

(Continued)

FOREIGN PATENT DOCUMENTS

| | | |
|---|---|---|
| JP | 2000-268093 | 9/2000 |
| JP | 2001-282940 | 10/2001 |

(Continued)

OTHER PUBLICATIONS

English Translation of the International Preliminary Report on Patentability issued Apr. 22, 2009 in corresponding International Patent Application PCT/JP2006/320577.

Yamana, K. et al., *A Support System for Target Selection by Blog Retrieval and Similar Targets' Information*, IPSJ SIG Technical Support, vol. 2005, No. 96, pp. 17-21.

(Continued)

*Primary Examiner* — Jonathan G Sterrett
*Assistant Examiner* — Stephen S Swartz
(74) *Attorney, Agent, or Firm* — Staas & Halsey LLP

(57) ABSTRACT

It is an object to provide a mechanism that can efficiently collect and accumulate unspecified large number of information as much as possible for marketing activities and that can make use of the information. An information collection program includes: an information receiving step that receives information provided from an information provider; an information collecting/managing step that manages the received information in association with the information provider; an information analyzing step that analyzes the managed information; an analysis information managing step that manages the analyzed information; a feedback information receiving step that receives evaluation based on a result of utilizing the analyzed information as feedback information; and an evaluating step that gives an evaluation point to the information provider or the provided information based on the received feedback information.

18 Claims, 9 Drawing Sheets

(56) References Cited

U.S. PATENT DOCUMENTS

| | | | |
|---|---|---|---|
| 2002/0198994 A1* | 12/2002 | Patton et al. | 709/225 |
| 2003/0105668 A1 | 6/2003 | Segawa | 705/14 |
| 2003/0105669 A1 | 6/2003 | Tsuchiya | 705/14 |
| 2003/0184649 A1* | 10/2003 | Mann | 348/161 |
| 2004/0010417 A1* | 1/2004 | Peled | 705/1 |
| 2006/0101334 A1* | 5/2006 | Liao et al. | 715/523 |
| 2006/0224452 A1 | 10/2006 | Ng | |
| 2006/0253584 A1* | 11/2006 | Dixon et al. | 709/225 |
| 2007/0174630 A1* | 7/2007 | Shannon et al. | 713/183 |
| 2007/0288323 A1* | 12/2007 | Halevy | 705/26 |
| 2008/0046397 A1* | 2/2008 | Shirai et al. | 707/1 |

FOREIGN PATENT DOCUMENTS

| | | |
|---|---|---|
| JP | 2003-167990 | 6/2003 |
| JP | 2003-242397 | 8/2003 |
| JP | 2005-84986 | 3/2005 |

OTHER PUBLICATIONS

International Search Report dated Oct. 27, 2006 in corresponding International Application No. PCT/JP2006/320577 (10 pp.).

European Search Report dated Jul. 1, 2010 and issued in corresponding European Patent Application 06821882.5.

* cited by examiner

FIG. 8

*CERTIFICATION INFORMATION*

ANALYSIS CODE =K00001

RATING OF CREDIBILITY/ ACCURACY OF INFORMATION =80/100

THIS INFORMATION IS ONE OBTAINED THROUGH OUR OWN COLLECTING, COUNTING, AND ANALYSIS/MINING WORK

TIME STAMP

DIGITAL SIGNATURE OF MARKETING COMPANY

INFORMATION COLLECTION PROGRAM, INFORMATION COLLECTION APPARATUS, AND INFORMATION COLLECTION METHOD

This application is a continuation of International Application No. PCT/JP2006/320577, filed Oct. 16, 2006, the disclosure of which is incorporated herein in its entirety by reference.

TECHNICAL FIELD

The present invention relates to a technique in which a service provider can efficiently collect and accumulate unspecified large number of information as much as possible for marketing activities and that can make use of the information without collecting and accumulating personal or private information of an information provider.

BACKGROUND ART

Along with recent advancement in IT technology, paper documents are gradually being replaced by electronic (digital) documents. Accordingly, an information collection/information accumulation approach using an information communication medium (online) such as the Internet is becoming mainstream in place of a conventional face-to-face information collection approach.

For the purpose of expanding a current business or launching/developing a new business, a service provider has collected/accumulated information using the following methods (1) to (5).

(Conventional Technique 1)

As an information collection/accumulation method employed as part of such marketing activities in real world, opinions (reports) with respect to products or services provided by the service provider have been directly collected/accumulated from customers. This method mainly focuses on grasping more general opinion/trend by targeting an area where age and a male-female ratio is close to national average. Concretely, for example, samples of products (already-released products or new products) are passed out in a crowded area such as an area around a station, and use feeling, point to be improved, opinion/desire, and the like with respect to the products are collected/accumulated at a future date through a mailed questionnaire or communication means such as telephone.

(Conventional Technique 2)

As a general online information collection approach, there is known a method in which an online message board is set up for free posting of opinion, desire or the like.

(Conventional Technique 3)

Further, as a method for collecting unspecified large number of information, there is known a method that collects/accumulates information contained in the web page (including blog or the like) that the information provider itself sets up by utilizing Internet search sites.

(Conventional Technique 4)

Further, there is known an online service system in which the individual users (information providers) make a contract with the service provider and, based on the contract, the service provider collects/accumulates personal or private information of the users, their purchasing habit or trend, and the like as needed. Through such an online service system, information relating to a product that the user has actually purchased, information relating a product that the user has not purchased although he or she has checked the product, information relating to a product that the user has recommend to another user, and the like are collected/accumulated on an as-needed basis. The service provider uses such information to pick up products that a target user really want based on his or her past purchasing trend and display together with search results, to thereby promote further purchasing. Further, the service provider can urge the user to take precautions by using such information so as to, e.g., prevent him or her from purchasing the same item that he or her purchased five years ago.

(Conventional Technique 5)

As a patent application relating to the present invention, there is known "Coupon issuance method for issuing coupon to information provider as reward, coupon issuance system for issuing coupon to information provider, and recording medium storing coupon issuance program for issuing coupon to information provider" (refer to e.g., Patent Document 1). This is a technique aiming to increase the number of messages (information) to be posted, through a network, on a posting site and collect a large number of quality and useful information from the viewpoint of the user, such as "word-of-mouth" information. Concretely, the method disclosed in Patent Document 1 accumulates personal information and past posting history of the information provider, checks the content of the posted information, determines the accumulated personal information and past posting history (the number of posting, quality of posted information, and the like), and generates coupon information based on the determination.

Patent Document 1: Japanese Laid-Open Patent Publication No. 2006-268093

DISCLOSURE OF THE INVENTION

Problems to be Solved by the Invention

In the information collection method of the convention technique 1 employed in real world, virtually no one voluntarily responds to (through mail or telephone) a questionnaire without compensation. Accordingly, with this method, the service provider cannot acquire valuable opinion/desire from the information provider. In order to cope with this problem, gift certificates or the like (e.g., QUO card (1,000 yen)) of the same amount are often presented to all the information providers.

However, a useful level or contribution level differs among the information providers (e.g., some information provider writes a large number of papers, some information provider writes useful information, some information provider writes information of little value, . . . ) and, despite such a situation, reward/compensation of the same amount is uniformly given to all the information providers in most cases. Patent Document 1 does not describe a method of determining the amount of compensation in accordance with the useful level or contribution level. Further the phrase "uniformly the same amount" reduces motivation of the information providers to provide information. Thus, the service provider could not always acquire useful information.

In the information collection method of the conventional technique 2 which uses an online message board on the web site, the service provider side prompts the users to access the message board and post messages using a catch-phrase saying, for example, "Rewards are available to those who post messages" through a direct mail, post card, telephone, or the like in order to have as many users as possible input information.

However, recently, the number of online frauds, such as phishing or one-click fraud is rising, and the users pay increasing attention to relevant online crimes. Under such circumstances, the users do not easily access the web message board even if prompted by means of a direct mail, post card, telephone, or the like. As a result, the service provider can only acquire information from users who trusts the service provider's web site and has interest therein. Consequently, only favorable opinions are acquired. Thus, with this method, it is difficult to collect unspecified large number of information.

In the information collection method of the conventional technique 3 which uses the search sites, information collected/accumulated are useful for marketing activities to some extent. However, the information collected by this method may include personal or private information, so that such information cannot be used without permission of the owner of this site (or blog). Some service providers utilize such information for marketing purpose without permission, which will be a big problem in terms of personal or private information protection.

In a method like the conventional technique 4 in which the trend of the user is collected after a contract is made based on a certain level of confidential relationship between the user and service provider, the user needs to make contracts with a certain large number of service providers in order to receive many services and, accordingly, he or she needs to disclose ones personal information to all the contracted service providers. Further, in this method, the user itself needs to manage to what extent and to which service provider he or she has provided ones personal information.

The service provider side also needs to manage the personal information of each user. In some cases, the service provider needs to acquire a Privacy Mark, or requires knowledge and know-how for performing analysis/mining using the collected information, which increases cost. Further, even in this method, the service provider can acquire only certain piece of information from only the contracted users. Thus, also with this method, it is difficult to collect unspecified large number of information.

In the method of the conventional technique 5 which is disclosed in Patent Document 1, it is difficult to determine the quality of the provided information using only the past posting history, and a mechanism for evaluating the information provider in accordance with his or her contribution level which indicates the level of usefulness of the information to the service provider has not been introduced. As a result, motivation of the users to provide information cannot significantly be increased.

That is, the above conventional techniques cannot meet the following three requirements (A) to (C) at the same time.

(A) To collect unspecified large number of information from a wide rage of sources effectively and cyclopaedically and to make use of the collected information.

(B) To have a method and mechanism of determining compensation to the information provider for the purpose of enhancing motivation of the information provider to provide information, inspiring commitment of the information provider, increasing manpower so as to collect unspecified large number of information.

(C) To utilize the collected information for marketing while protecting the personal or private information of the information provider.

An object of the present invention is to provide a mechanism by which a service provider can efficiently collect and accumulate unspecified large number of information as much as possible for marketing activities and that can make use of the information without collecting and accumulating the personal or private information of an information provider.

Means for Solving the Problems

To solve the above problems, according to a first aspect of the present invention, there is provided an information collection program allowing a computer to collect information, the program being characterized by comprising: an information receiving step that receives information provided from an information provider; an information collecting/managing step that manages the information received in the information receiving step in association with the information provider; an information analyzing step that analyzes the information managed in the information collecting/managing step; an analysis information managing step that manages the information analyzed in the information analyzing step; a feedback information receiving step that receives evaluation based on a result of utilizing the analyzed information as feedback information; and an evaluating step that gives an evaluation point to the information provider or the provided information based on the feedback information received in the feedback information receiving step.

Further, according to a second aspect of the present invention, there is provided an information collection apparatus for collecting information, characterized by comprising: an information receiving section that receives information provided from an information provider; an information collecting/managing section that manages the information received by the information receiving section in association with the information provider; an information analyzing section that analyzes the information managed by the information collecting/managing section; an analysis information managing section that manages the information analyzed by the information analyzing section; a feedback information receiving section that receives evaluation based on a result of utilizing the analyzed information as feedback information; and an evaluating section that gives an evaluation point to the information provider or the provided information based on the feedback information received by the feedback information receiving section.

Further, according to a third aspect of the present invention, there is provided an information collection method allowing a computer to collect information, the method being characterized by comprising: an information receiving step that receives information provided from an information provider; an information collecting/managing step that manages the information received in the information receiving step in association with the information provider; an information analyzing step that analyzes the information managed in the information collecting/managing step; an analysis information managing step that manages the information analyzed in the information analyzing step; a feedback information receiving step that receives evaluation based on a result of utilizing the analyzed information as feedback information; and an evaluating step that gives an evaluation point to the information provider or the provided information based on the feedback information received in the feedback information receiving step.

BRIEF DESCRIPTION OF THE DRAWINGS

FIG. 8 is view showing an example of certification information; and

BEST MODE FOR CARRYING OUT THE INVENTION

Figure 1:
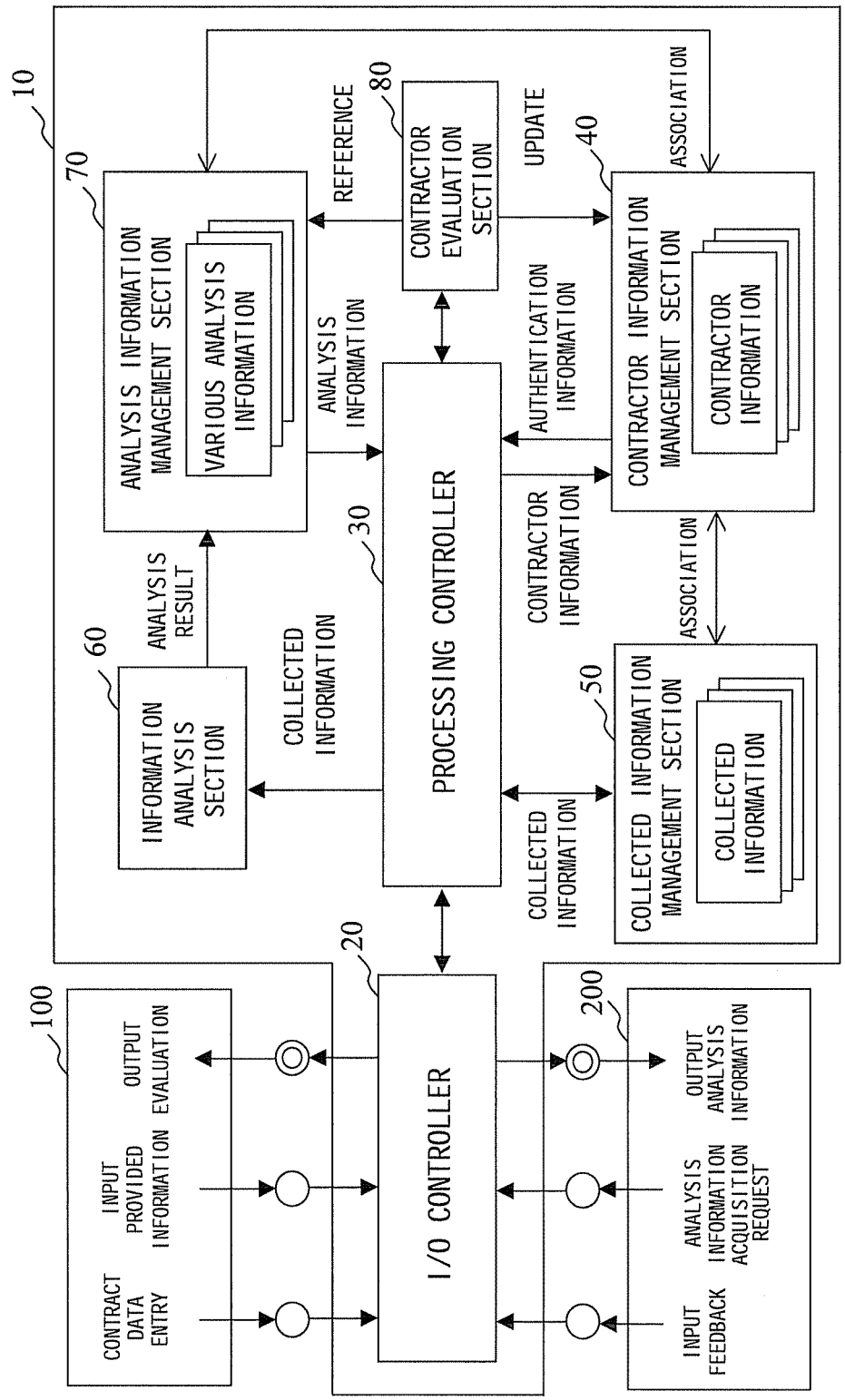
FIG. 1 is a block diagram showing a configuration of an embodiment of the present invention.

FIG. 1 is a view for explaining the principle of the present invention.

An information collection/analysis system 10 that a dedicated marketing company (hereinafter, referred to merely as "marketing company") is so provided as to mediate between a client of an information provider 100 and a client of a service provider 200. In FIG. 1, the information collection/analysis system 10 corresponds to a main system according to the embodiment of the present invention and refers to the entire system that the marketing company has. Provided information input by the information provider 100 is passed to a collected information management section 50 through an I/O controller 20 and a processing controller 30 and is collectively managed in association with the information provider 100.

The information accumulated/managed in the collected information management section 50 is taken out when needed and is subjected to analysis/mining processing according to a given theme by an analysis/mining means that an information analysis section 60 has. Various analysis information are accumulated/managed in an analysis information management section 70. At this time, the various analysis information managed in the analysis information management section 70 are managed in association with the information of the information provider 100 which has been used for the analysis/mining processing. The personal information and the like of the information provider 100 are collectively managed in a contractor information management section 40 and are associated with the analysis information.

The information collection/analysis system 10 provides a means for agreeing to an analysis information acquisition request issued from the service provider 200 and outputting the requested various analysis information. The information collection/analysis system 10 further has a means for collecting feedback information with respect to the analysis information from the service provider 200 and provides a means for receiving the feedback information as input data to evaluate the information provider 100 using the contractor evaluation section 80 and reflecting the evaluation in compensation so as to update and output the compensation information. Based on the evaluation of the information providers 100, the information analysis section 60 provides a means for rating the accuracy of the subsequent collected information to be provided from the information providers 100, rating the credibility and accuracy of the analysis/mining processing result.

Figure 2:
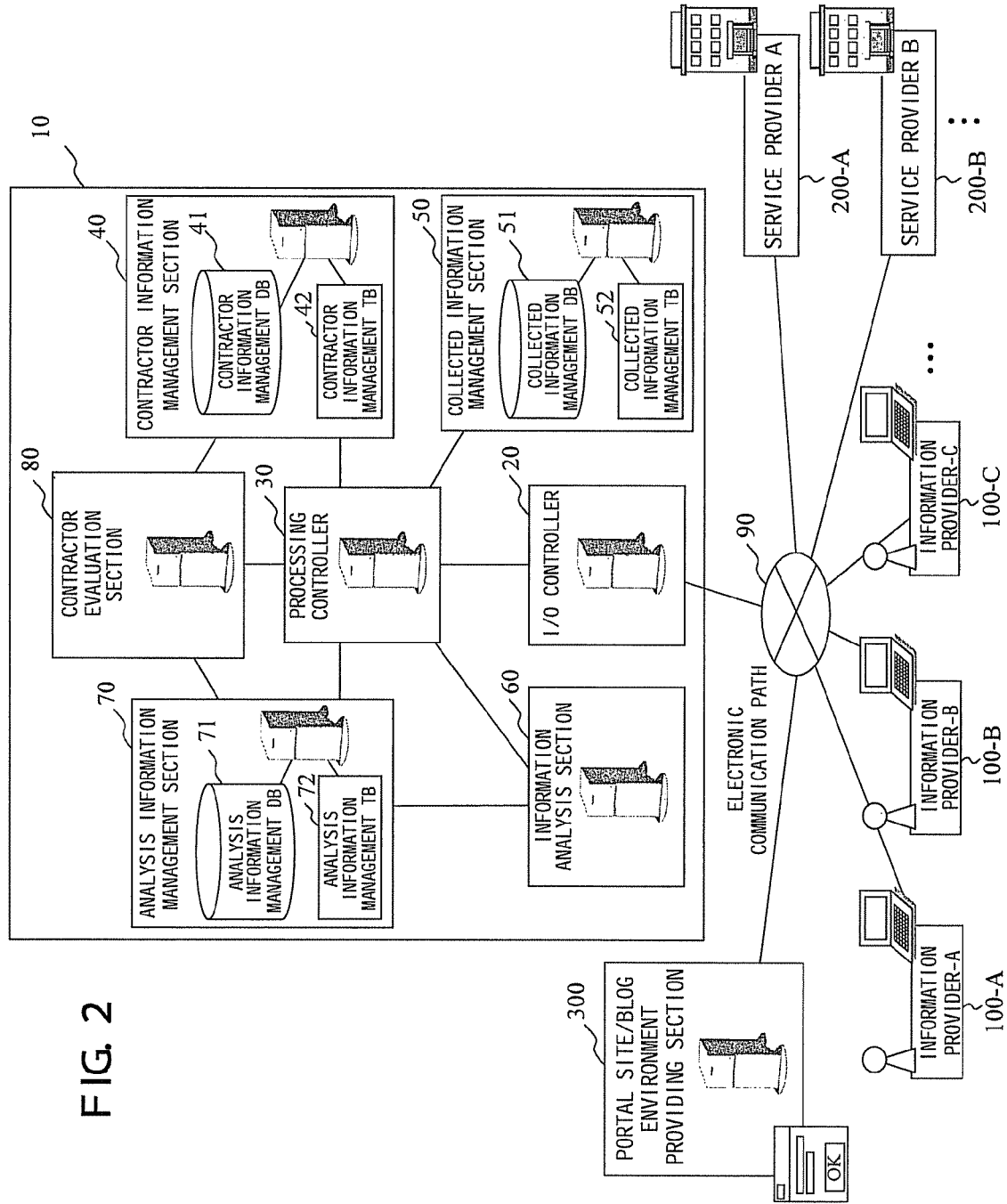
FIG. 2 is a block diagram showing a first embodiment of the present invention.

FIG. 2 is a block diagram showing a network configuration example according to the embodiment of the present invention. In FIG. 2, the same reference numerals as those in FIG. 1 denote the same or corresponding parts as those in FIG. 1. The information collection/analysis system 10 of FIG. 2 includes the I/O controller 20, processing controller 30, contractor information management section 40, collected information management section 50, information analysis section 60, analysis information management section 70, and contractor evaluation section 80. Configurations and functions of the respective sections will be described below.

The I/O controller 20, which functions as a reception counter of the information collection/analysis system 10, receives input information from the information providers (100-[A, B, C . . . ]), service providers (200-[A, B, C]), and a portal site/blog environment providing section 300 and transmits output information acquired from the processing controller 30.

The processing controller 30, which functions as a central controller of the information collection/analysis system 10, issues a processing request to the above sections. Further, the processing center 30 receives a request from the above sections and notifies the I/O controller 20 of the reception of the request.

The contractor information management section 40 has a function of storing/managing the information concerning each contractor which is required for the contractor to utilize the information collection/analysis system 10. The contractor information management section 40 is constituted by two sub components: a contractor information management DB 41; and a contractor information management TB 42.

The contractor information management DB 41 is managed in the contractor information management section 40 and functions as an archive for storing/managing the contractor information. The content and management of the contractor information stored/managed in the DB 41 will be described later.

The contractor information management TB 42 is managed in the contractor information management section 40 and includes entry information for consolidating the contractors. The contractor information management TB 42 cooperates with the contractor information management DB 41.

The collected information management section 50 has a function of receiving a collected information storage request from the processing controller 20 and storing/managing the collected information. The collected information management section 50 is constituted by two sub components: a collected information management section DB 51 and a collected information management TB 52.

The collected information management section DB 51 is managed in the collected information management section 50 and functions as an archive for storing/managing the information collected from the information provider 10. The content and management of the collected information stored/managed in the DB 51 will be described later.

The collected information management TB 52 is managed in the collected information management section 50 and includes entry information for consolidating the collected information. The collected information management TB 52 cooperates with the collected information management section DB 51.

The information analysis section 60 receives as an input collected information accumulated in the collected information management section 50 and performs various information analysis/mining processing using the collected information.

The analysis information management section 70 receives analysis/mining processing results from the information analysis section 60 and stores/manages the analysis/mining processing results. In addition, the analysis information management section 70 receives an analysis information acquisition request from the processing controller 30 and outputs appropriate analysis information. The analysis information management section 70 is constituted by two sub components: an analysis information management DB 71; and an analysis information management TB 72.

The analysis information management DB 71 is managed in the analysis information management section 70 and functions as an archive for storing/managing the analysis information obtained by performing analysis/mining using the information collected from the information provider 100. The content and management of the analysis information stored/managed in the DB 71 will be described later.

The analysis information management TB 72 is managed in the analysis information management section 70 and includes entry information for consolidating the analysis information. The analysis information management TB 72 cooperates with the analysis information management DB 71.

The contractor evaluation section 80 has a function of evaluating the respective information providers 100 and reflecting the evaluation in the contractor information so as to update and output the contractor information.

The configurations and functions of the respective sections of the information collection/analysis system 10 are as described above. In the following, external actors existing around the information collection/analysis system 10 will be described.

An electronic communication path 90 is a means for transmitting/distributing the processing request and provided information from the respective actors. The information collection/analysis system 10 and external actors existing around the information collection/analysis system 10 are all connected to the electronic communication path 90. The electronic communication path 90 corresponds to a communication protocol such as the Internet, Intranet, Extranet, or wide area network.

The information provider 100 is an actor that utilizes the information collection/analysis system 10 and accesses the information collection/analysis system 10 through the electronic communication path 90 and portal site/blog environment providing section 300.

The service provider 200 is an actor that utilizes the information collection/analysis system 10 and accesses the information collection/analysis system 10 through the electronic communication path 90.

The portal site/blog environment providing section 300 is used mainly by the information provider 100 who has made a contract with a marketing company having the information collection/analysis system 10. The information provider 100 can provide information by using a portal site or blog prepared in the portal site/blog environment providing section 300. The portal site/blog environment providing section 300 is provided in the form of cooperation with the information collection/analysis system 10, and an I/O interface between the information provider 100 and information collection/analysis system 10 is provided as one of menus set in the portal site/blog. The portal site/blog environment providing section 300 may be installed either outside or inside the marketing company.

Figure 3:
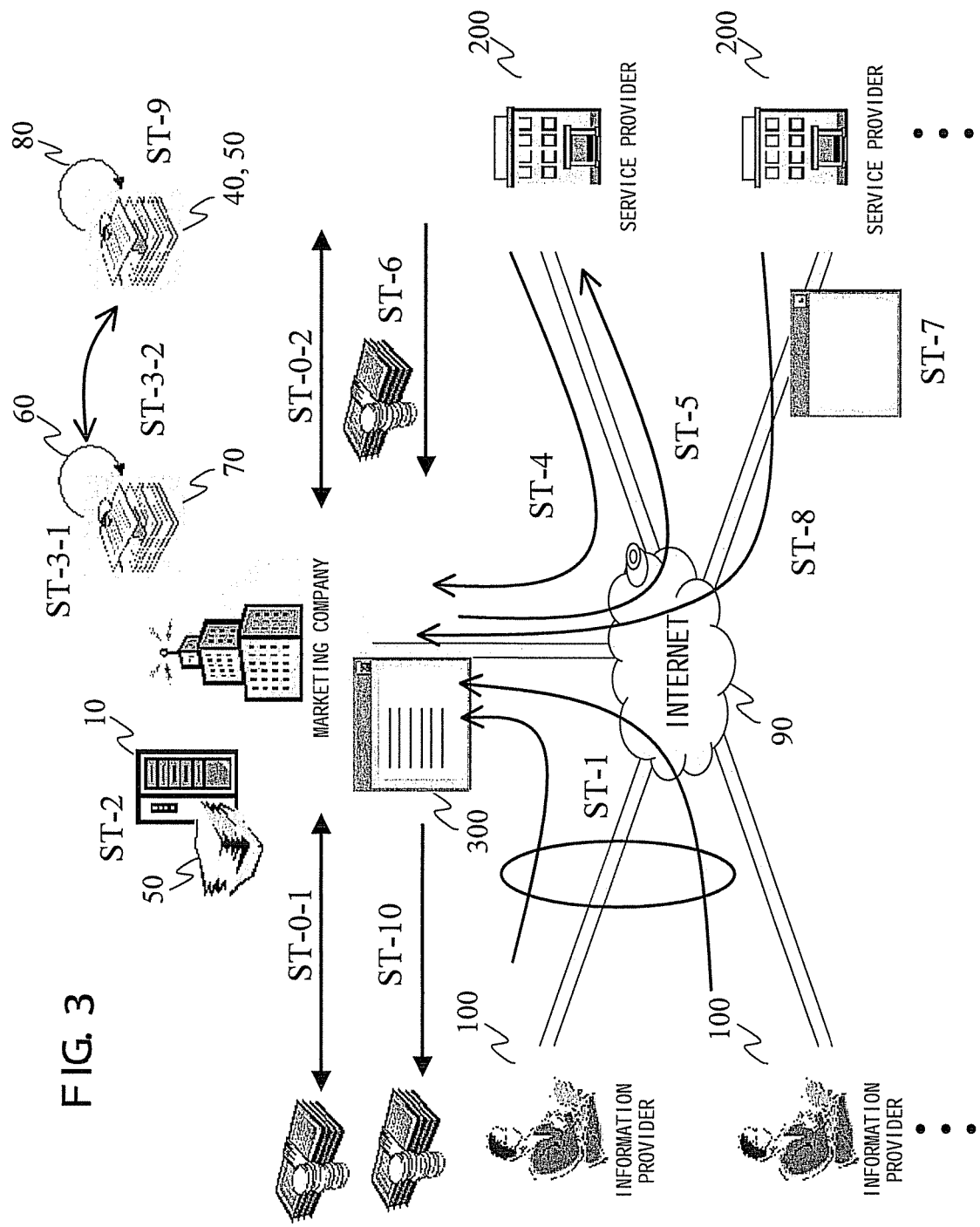
FIG. 3 is an explanatory view showing operation of the first embodiment of the present invention.
Figure 4:
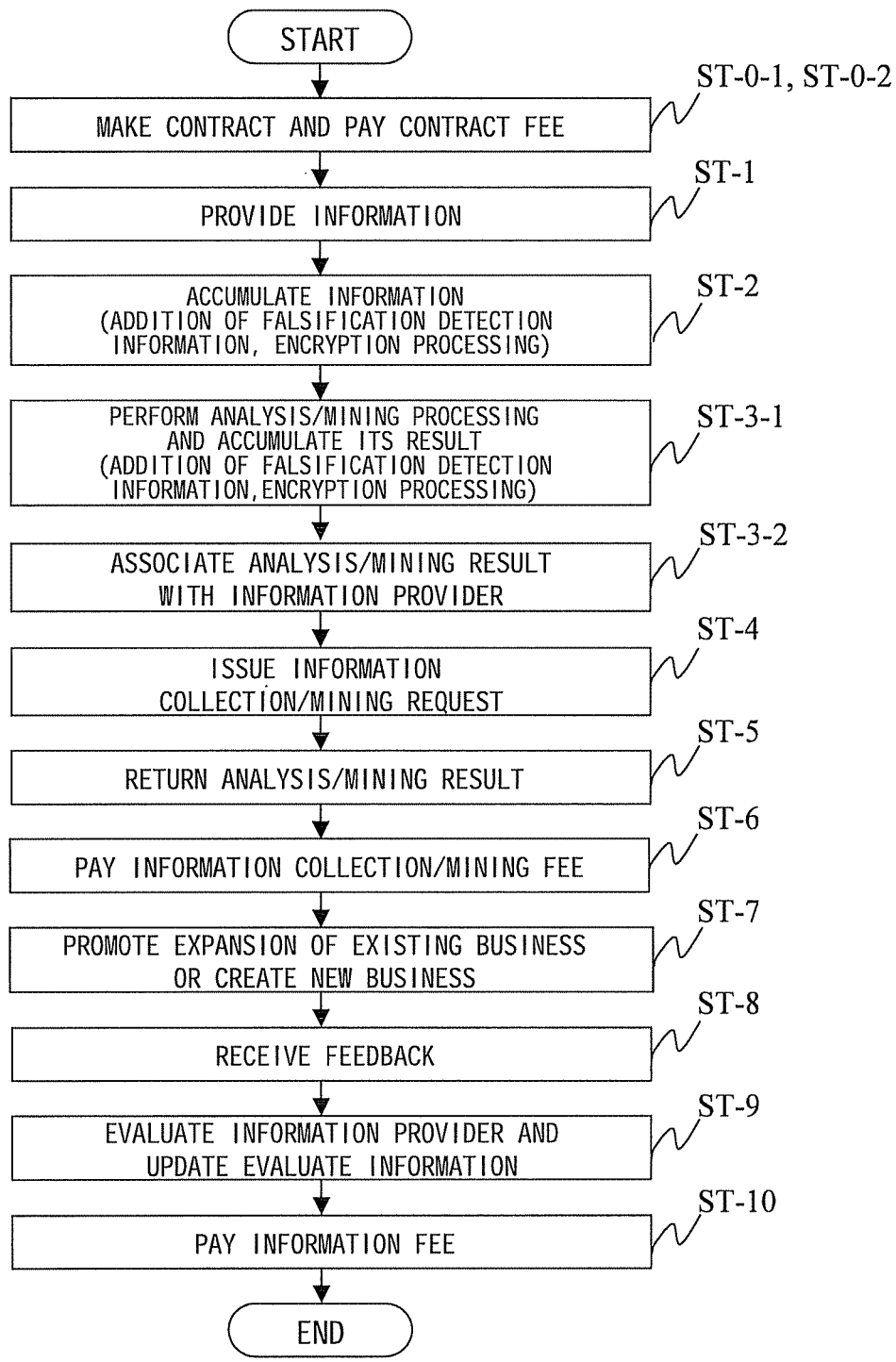
FIG. 4 is a flowchart showing operation of the first embodiment of the present invention.

In the following, how the respective processing functions described in the principle (FIG. 1) and system configuration (FIG. 2) are realized will be described. FIG. 3 is a view showing characters and a processing flow in the present embodiment. FIG. 4 is a processing flowchart in the present embodiment. Hereinafter, a description will be made in the order of steps ST-N (1, 2, 3, . . . ) in FIGS. 3 and 4.

The information provider 100 and marketing company make a basic contract with each other under certain conditions. In the contract, the marketing company assures that it pays a basic contract fee to the information provider 100 depending on the ability of the information provider 100. That is, the marketing company makes the basic contract after confirming/examining the identity (personal information) of the information provider 100 and his or her desired information collection method, the use experience of blog, history (number of years) of usage of IT tools, information providing ability, and the like through interview, etc., with the information provider 100. Based on the confirmation/examination, the basic contract fee is determined (step ST-0-1).

Figure 5:
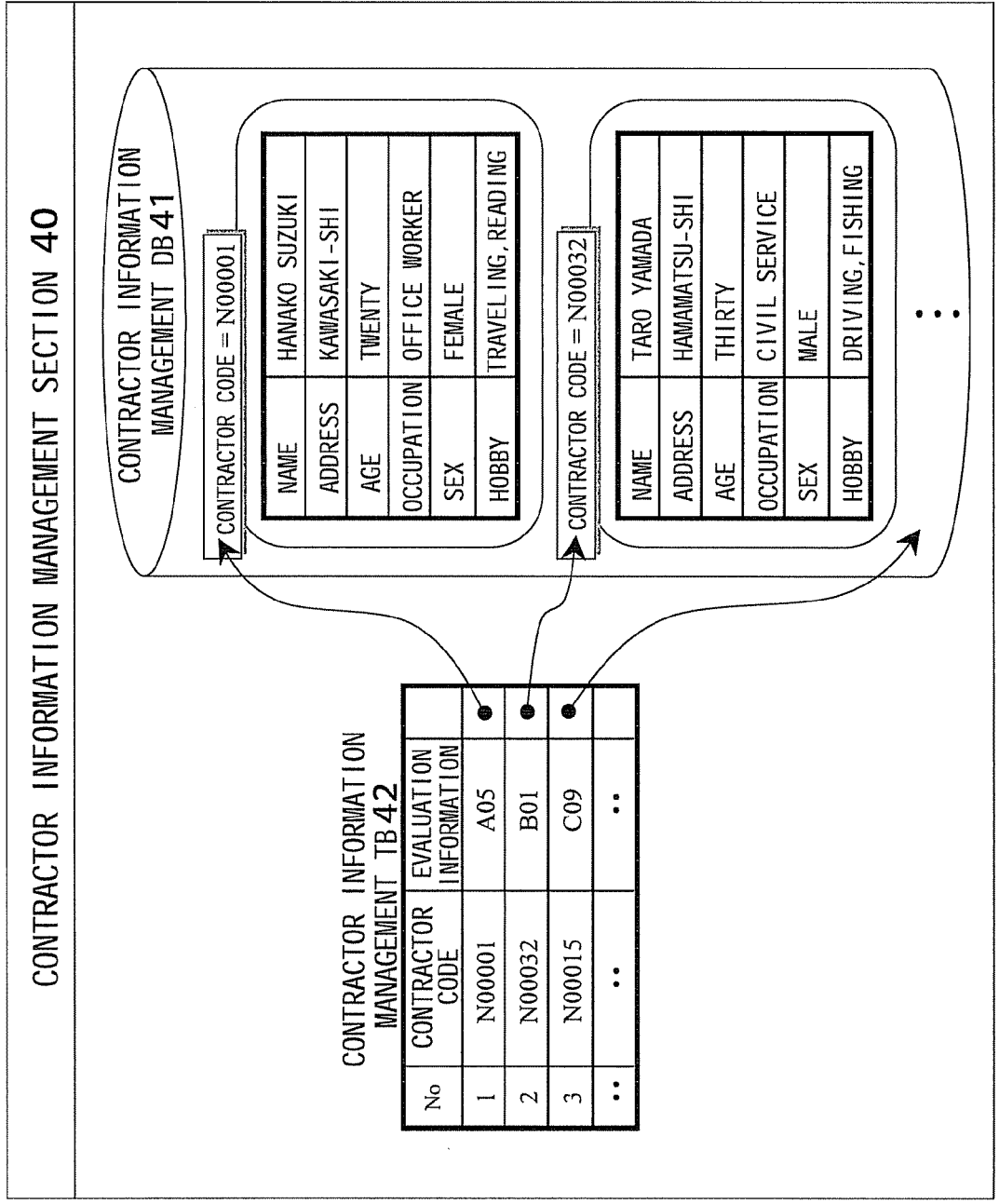
FIG. 5 is a view showing the content of information managed in a contractor information management section.

The contractor information is stored/managed in the contractor information management section 40 of the information collection/analysis system 10. The entity of the contractor information is stored in the contractor information management DB 41 of the contractor information management section 40, and the entry information of the contractor information is managed in the contractor information management TB 42. FIG. 5 shows the content of the information stored/managed in the contractor information management section 40.

The contractor information is stored in the contractor information management section 40 in association with an ID (contractor code) for uniquely identifying/managing the contractor. The contractor information to be stored/managed includes basic personal information, such as "name, address, age, occupation, sex, hobby" required for the analysis/mining processing and extended personal information such as "ID for uniquely identifying/managing contractor, evaluation information".

The extended personal information is managed as the entry information in the contractor information management TB 42 and acts as intermediary with the contractor information management DB 41. The evaluation information included in the extended personal information is used for evaluating the information provider 100 and rating the credibility and accuracy of the analysis/mining result. The information provided by the information provider 100 is used for the analysis/mining processing as needed. Every time the information is used for the analysis/mining processing, a point is given to the used information. Further, an additional point is given to the collected information based on which the marketing company has acquired useful feedback information from the service provider 200 and therefore which has been highly evaluated. The evaluation information is set depending on the point which is an evaluation index of the collected information.

The information stored/managed in the contractor information management section 40 includes personal or private information. Thus, needles to say, it is necessary to take measures for preventing/detecting falsification or intercept made by a third party, such as addition of falsification detection information, encryption, and the like.

The service provider 200 and marketing company make a contract with each other (step ST-0-2). However, in the present embodiment, a configuration is adopted in which the service provider 200 merely cooperates with the marketing company, and the payment is made at the time of occurrence of an information collection/marketing request. However, there may be a case where the marketing company charges a basic contract fee from the service provider 200 at the time of making the basic contract.

The information provider 100 provides information using the following methods. The first method is a method using the portal site/blog environment providing section 300 installed outside or inside the marketing company. For example, the information provider 100 utilizes a portal site/blog environment that the marketing company has prepared/provided for the information provider 100 after the step (step ST-0-1) of making the contract with the information provider 100 or utilizes a portal site/blog that the information provider 100 itself is managing.

The portal site or blog may have a function called RSS (Rich Site Summary). The RSS is an XML-based format that describes meta-data such as index or summary of the web site or blog in a structured manner and is mainly used for publicizing update information of the web site. A document formatted in RSS can include tile, address, index, summary, update time, and the like of each page of the web site or blog. By using an RS document, it is possible to effectively grasping the update information of a large number of web sites in a unified manner.

By using the portal site or blog having the RSS function, the marketing company can effectively collect information. Even if the information provider 100 does not have his or her own portal site or blog, by providing an easy-to-use and attractive portal site or blog environment to the information provider 100 as a service, it is possible to increase user participation rate. The information provider 100 uses the portal site/blog with RSS function to write information such as daily activity, opinion, or impression in a diary format.

The content to be written is left to the information provider 100, and thus the information provider 100 is not forced to write information disadvantageous to oneself, such as private information or information that he or she does not want to disclose. That is, although the information provider 100 is bound by a contract to some extent, the information provider 100 need not disclose all information, or need not write information that he or she does not want to disclose. It is desirable that by adopting such a mechanism where the marketing company does not forcibly collect/control information but the information provider 100 issues information on a voluntary basis, it is possible to achieve a configuration where the information provider 100 itself protects his or her private information.

However, there may be a case where the marketing company asks the information provider 100 to write anything concerning a given market or business field. In this case, the information provider 100 complies with the instruction and writes the corresponding information. However, even in such a case where a certain topic is provided, the detailed content of the information to be written is determined on the initiative of the information provider 100 itself. The second method is a method in which the information provider 100 dose not utilize an IT tool such as the portal site or blog but directly visits to the marketing company and hands over information directly to a person in charge. Further, there can be considered a case where an information provider who has not made a contract with the marketing company directly visits the marketing company to promote ones information.

Figure 6:
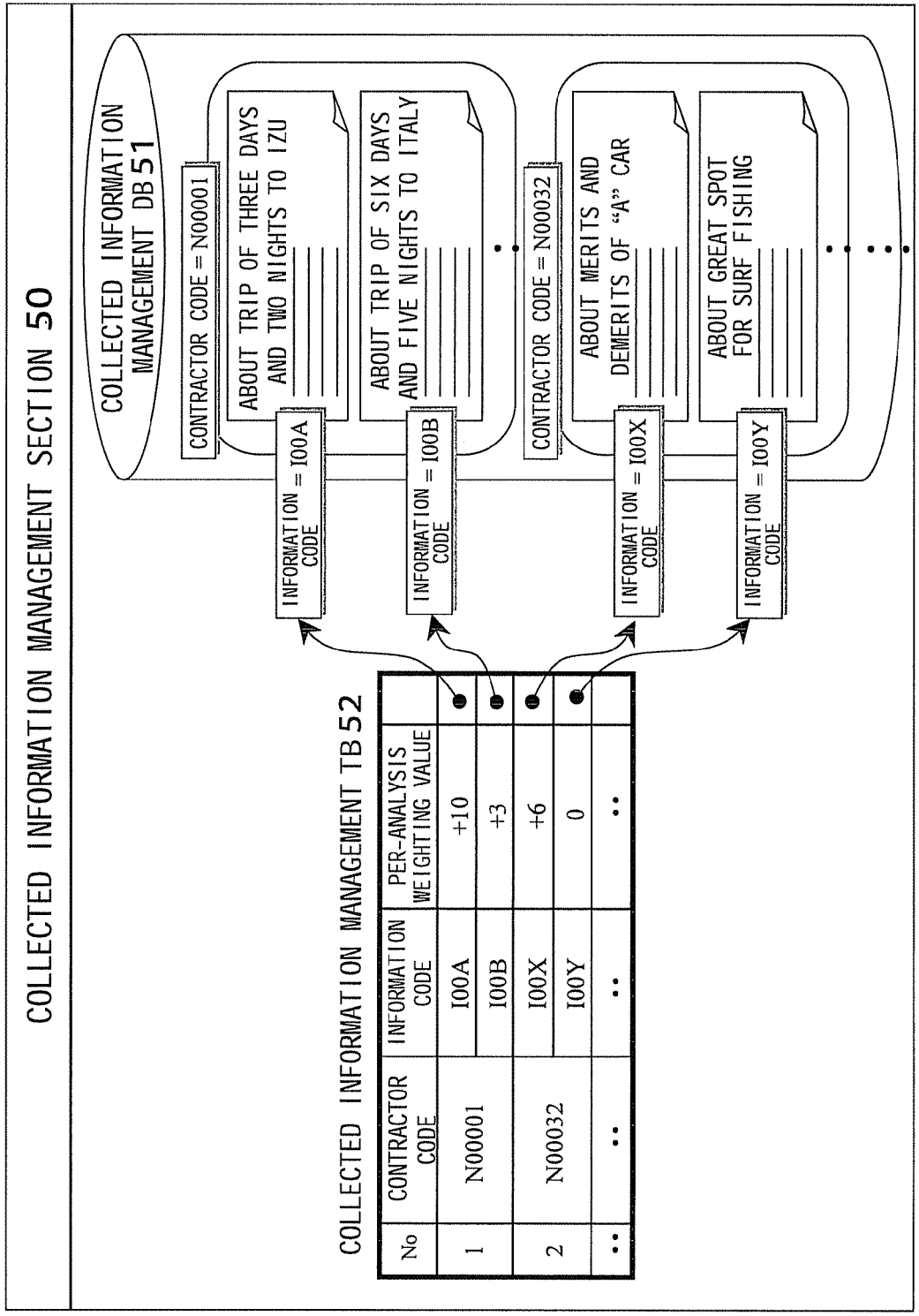
FIG. 6 is a view showing the content of information managed in a collected information management section.

Then, the information collection/analysis system 10 provided in the marketing company stores the information collected from the information provider 100 in the collected information management DB 51 of the collected information management section 50 and stores the entry information of the collected information in the collected information management TB 52 (step ST-2). The entry information here includes contractor code, information code, per-analysis weighting value of the information provider 100. These information are to be used for the analysis/mining processing performed using the collected information. FIG. 6 shows the content of the information stored/managed in the collected information management section 50.

The collected information is stored for each information provider 100 in the collected information management section 50 in association with an ID (contractor code) for uniquely identifying/managing the contractor. Further, information code is assigned to each collected information. For example, in FIG. 6, as the collection information provided from an information provider 100 of contractor code=N00001, a story relating to events that she experienced on her trip and impression during the trip is stored/managed.

That is, when the contractor information management DB 41 is searched, using the contractor code as a key, from the contractor information management TB 42, it can be found that the contractor code=N00001 indicates Hanako Suzuki whose hobby is traveling and that she has provided information mainly focusing on travel. Further, information codes (=I00A, I00B) are assigned to the collected information from Hanako Suzuki, making it easy to perform content-based searching of "what kind of information from which information provider".

The information stored/managed in the collected information management DB 51 includes personal or private information of the information provider 100 (contractor). Thus, needless to say, it is necessary to take measures for preventing/detecting falsification or intercept made by a third party, such as addition of falsification detection information, encryption, and the like.

Further, information indicating a per-analysis weighting value is assigned to each information code. For example, a default value (0) is assigned to information that the information provider 100 provides for the first time. The default value 0 means that the information has never been used for the analysis/mining processing. A configuration may be possible in which every time the collected information is used for the analysis/mining processing, the weighting point is updated (increased). Further, an additional point is given to the collected information based on which the marketing company has acquired useful feedback information from the service provider 200 and therefore which has been highly evaluated. Also in this case, based on the evaluation information (point), update (increase) of the weighting value may be made for rating the credibility and accuracy of the analysis/mining processing result.

With the above configuration, the service provider 200 confirms the accuracy level of the received analysis/mining result (value of the analysis/mining result as information).

When a certain amount of information is accumulated in the collected information management section 50, the information collection/analysis system 10 uses the information analysis section 60 to perform the analysis/mining processing (step ST-3-1). Alternatively, the information collection/analysis system 10 performs the analysis/mining processing in response to an information collection/mining request from the service provider 200. Concretely, the information analysis section 60 receives as an input the collected information accumulated in the collected information management section 50 and uses the received collected information to perform various information analysis/mining processing.

For example, assumed is a case where the analysis/mining processing concerning travel is performed. In this case, information concerning travel, as represented by the travel diary of Hanako Suzuki, is collected through a full-text search from collected information of all information providers 100. More specifically, for example, the analysis/mining processing can be achieved in the form of a questionnaire or ranking with a theme such as "Popularity ranking for travel destination" "Area that you want to visit next time" "What do you want to do if you visit the same place", "Statistics based on age, sex, and address", and "Desired service at travel destination".

The information obtained as a result of the analysis/mining processing can be useful for a travel agency as data for revision of an existing business or creation of a new business. The result of the analysis/mining processing is stored/managed in the analysis information management section 70 of the information collection/analysis system 10. The entity of the analysis/mining result is stored in the analysis information management DB 71 of the analysis information management section 70 and the entry information of the analysis/mining result is managed in the analysis information management TB 72 (step ST-3-2).

Figure 7:
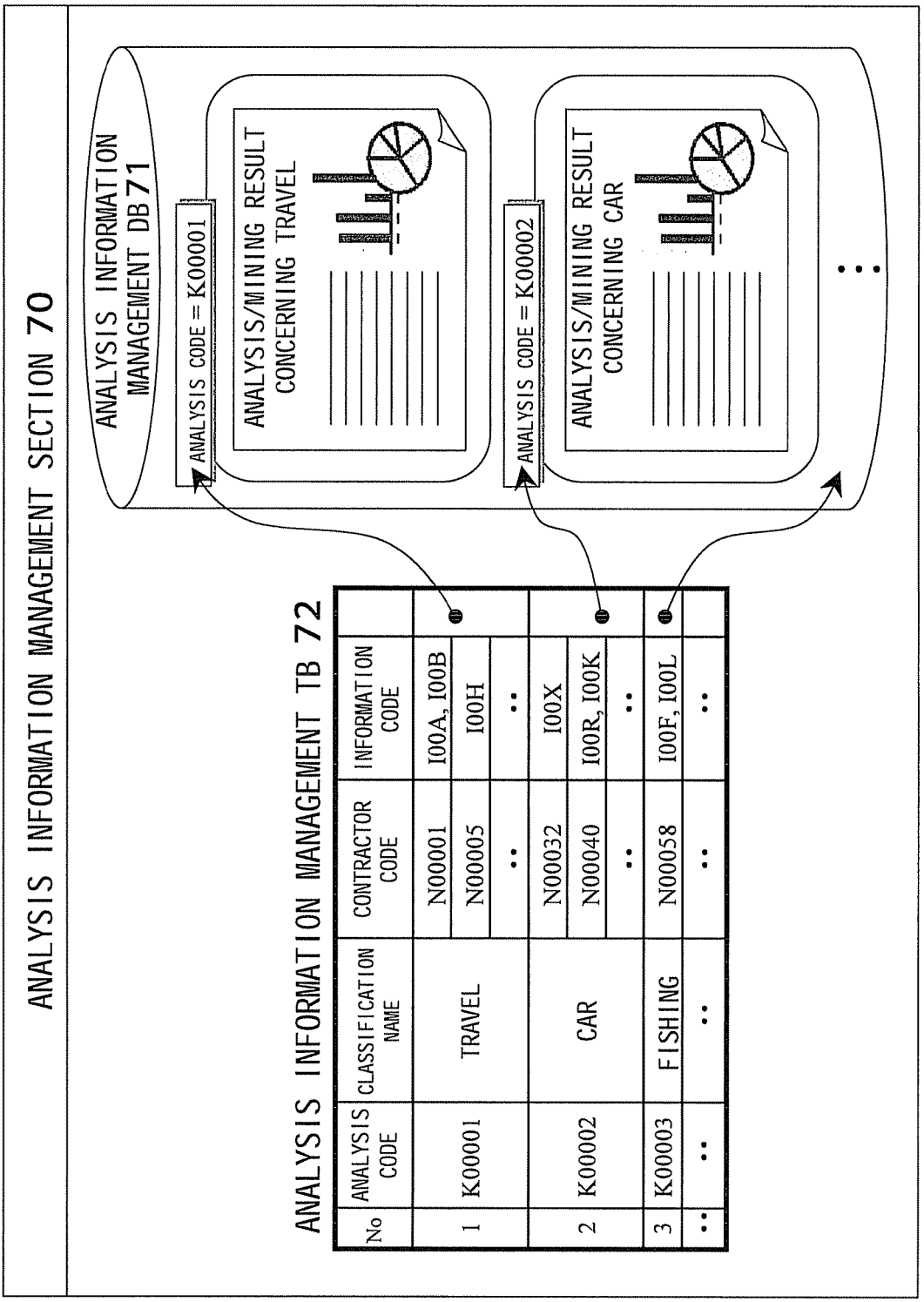
FIG. 7 is a view showing the content of the information stored/managed in an analysis information management section.

The entry information here includes analysis code, for uniquely identifying the analysis/mining result, classification name of the analysis/mining result, contractor code of the information provider 100 whose information has been used for the analysis/mining processing, and information code. These information are to be used for evaluating the information provider 100 based on the feedback from the service provider 200. FIG. 7 shows the content of the information stored/managed in the analysis information management section 70.

In the present embodiment, the analysis/mining results concerning travel, car, and the like are stored/managed in the analysis information management DB 71, and entry information indicating a link to each of the analysis/mining result is included in the analysis information management TB 72.

As the entry information, analysis code (=K00001) is assigned to the analysis/mining result concerning travel, and classification name=travel is recorded in association with the analysis code (=00001) for easy searching of the classification to which the analysis/mining result belongs. Further, it can be seen from the analysis information management TB 72, the analysis/mining result concerning travel is information obtained by using the information from information providers of contractor codes (=N00001 (information code=I00A, I00B), N00005 (information code=I00H)), and other several. Similarly, analysis code (=K00002) is assigned to the analysis/mining result concerning car, and it can be seen that the analysis/mining result concerning car is information obtained by using the information from information providers of contractor codes (=N00032 (information code=I00X), N00040 (information code=I00R, I00K)), and other several.

By employing such a storage/management method, it is possible to integrally manage association between the analysis/mining result and information provider whose information is used for creation of the analysis/mining result. This allows easy evaluation of the information provider 100 based on the feedback from the service provider 200. Although the information stored/managed in the analysis information management DB 71 does not include personal or private information of the information provider 100 (contractor), the fact remains that they are useful and important information. Thus, needless to say, it is necessary to take measures for preventing/detecting falsification or intercept made by a third party, such as addition of falsification detection information, encryption, and the like.

Then, the service provider 200 issues to the marketing company a request of certain theme-based information collection/mining processing (step ST-4). The information collection/analysis system 10 provided in the marketing company receives the processing request under the control of the I/O controller 20. For example, assuming that the service provider 200 is a travel agency that provides various tourism services or ticket issuance service, a request asking for, e.g., "age-specific ranking of travel destinations with comments about the reason for the answer", "list of services that travelers want to receive", or the like is conceivable.

Then, the information collection/analysis system 10 provided in the marketing company receives the information collection/mining request from the service provider 200 and issues information collection/mining request to the analysis information management section 70 though the processing controller 30 by means of input of a parameter corresponding to the processing content. Concretely, the analysis information management section 70 searches for the classification name input to the analysis information management TB 72 therein to check whether any corresponding analysis/mining result exists or not.

It is assumed that, in the present embodiment, "age-specific ranking of travel destinations (with comments)" is requested by the travel agency. Therefore, when the searching is performed using "classification name=travel" as a key, an analysis/mining result of analysis code (=K0001) is hit. The hit analysis/mining result is returned, directly or after being subjected to predetermined processing, to the service provider 200.

Here, a simple searching of "classification name=travel" is performed. However, in order to respond to various requests for the analysis/mining concerning travel, the classification needs to be further subdivided. For example, management of the analysis/mining results corresponding to "age-specific ranking of travel destinations (with comments)", "list of services that travelers want to receive" and the like exemplified in the present embodiment is required with regard to travel. Thus, the classification needs to be managed in a further subdivided manner.

If there exists no analysis/mining result corresponding to the request, processing may be performed starting from the information collection/accumulation of steps ST-1 and ST-2 where information on a corresponding theme is collected from the information provider 100 and accumulated or may be performed starting from the analysis/mining processing, accumulation, and association of the analysis/mining result with the information provider 100 of steps ST-3-1 to ST-3-2, by using collected provider information stored/managed in the collected information management section 50.

Irrespective of presence/absence of the analysis/mining result corresponding to the request, a mechanism that can quickly respond to the information collection/mining request from the service provider 200 is required. The system according to the present invention is made contemplating this point.

Subsequently, the marketing company returns the corresponding analysis/mining result to the service provider 200 (step ST-5). At this time, together with the analysis/mining result, the marketing company sends certification information for certifying that this result is issued from the marketing company in order to prepare for subsequent reception of the feedback information from the service provider 200 and evaluation of the contractor.

The certification information includes, in order to identify which analysis/mining result has been sent to the service provider 200, analysis code for uniquely identifying the analysis/mining result and rating of credibility and accuracy of information. Further, a digital signature indicating, at least, that the relevant analysis/mining result has been created and issued by the marketing company and a time stamp for certifying from when the relevant information has existed are added to the certification information.

With the digital signature/time stamp, the service provider 200 can confirm that the received information is information sent from the contracted marketing company. This makes it easy to detect presence/absence of falsification on the network, thereby enabling more safe information exchange. FIG. 8 shows an example of the certification information.

The rating of credibility/accuracy of information indicates, in percent figures, the level of the credibility/accuracy of the analysis/mining result. The rating of credibility/accuracy is calculated, at the analysis/mining processing time, based on the evaluation information of the information provider 100 recorded in the contractor information management TB 42 and per-analysis weighting value of each collected information recorded in the collected information management TB 52 and recorded in the certification information. In the present embodiment, the analysis/mining result exhibits 80% credibility/accuracy. Based on this figure, the service provider 200 can form a utilization plan of the received analysis/mining result. Although the analysis/mining result and corresponding certification information are provided in a separated manner in the present embodiment, the certification information may be included in the analysis/mining result.

In the present embodiment, information indicating when, which analysis/mining result was sent to which service provider 200 is not retained. When more detailed management is required, a transmission list (with digital signature and time stamp) of the analysis/mining results may be created in association with the service provider 200.

This analysis/mining result is not always provided only to a specific service provider 200. That is, the same analysis/mining result is inevitably provided to other service providers 200 if similar requests are made from them. In this case, other service providers may be companies in the same trade. That is, in the present embodiment, the information concerning travel can be determined to be information that all the travel agencies want, resulting in service competition between a plurality of travel agencies.

In order to cope with this problem, a rule may be adopted in which the analysis/mining result that has once been provided to a given service provider 200 is not provided to other service providers 200, i.e., duplication of information provision is inhibited. In this case, the ownership of the analysis/mining result may be transferred to the service transfer 200 that receives this information first. Further, in order to prevent the duplication of information provision, a flag or key word indicating "provided" may be recorded in the analysis code field of the analysis information management TB 72 or the above-mentioned transmission list indicating when, which analysis/mining result was sent to which service provider 200 may be created.

On the other hand, in the case where a rule in which one analysis/mining result is allowed to be provided to a plurality of service providers 200 is adopted, there is a possibility of occurrence of a dispute between the service providers 200 on which service provider 200 starts a service first. In order to avoid such a consequence, it is necessary to take some measures, such as addition of the digital signature/time stamp, for certificating that the service provider 200 has established the service business using the analysis/mining result and certificating that to which service provider 200 the analysis/mining result was provided first.

The service provider 200 receives the analysis/mining result from the marketing company, checks whether the content thereof meets the requirements of the request, and, if meets, pays information collection/mining fee to the marketing company as compensation (Step ST-6).

The service provider 200 uses the analysis/mining result acquired from the marketing company to promote an expansion of an existing business or create a new business (step ST-7).

Based on the progress of the business in step ST-7, the service provider 200 feeds back to the marketing company information indicating how useful the received analysis/mining result was and how the analysis/mining result contributed to the business (step ST-8).

At this time, the certification information which has been acquired together with the analysis/mining result is attached to the feedback information. This makes it easy for the marketing company to perform searching for/association with the analysis/mining result. Further, the service provider 200 may add any comment concerning the feedback information to the certification information and may attach a digital signature/time stamp thereof to the comment. At this time, a fact that the service provider 200 has added the comment to the valid certification information received from the marketing company and the service provider 200 has approved the comment must be able to be confirmed by the marketing company.

Figure 9:
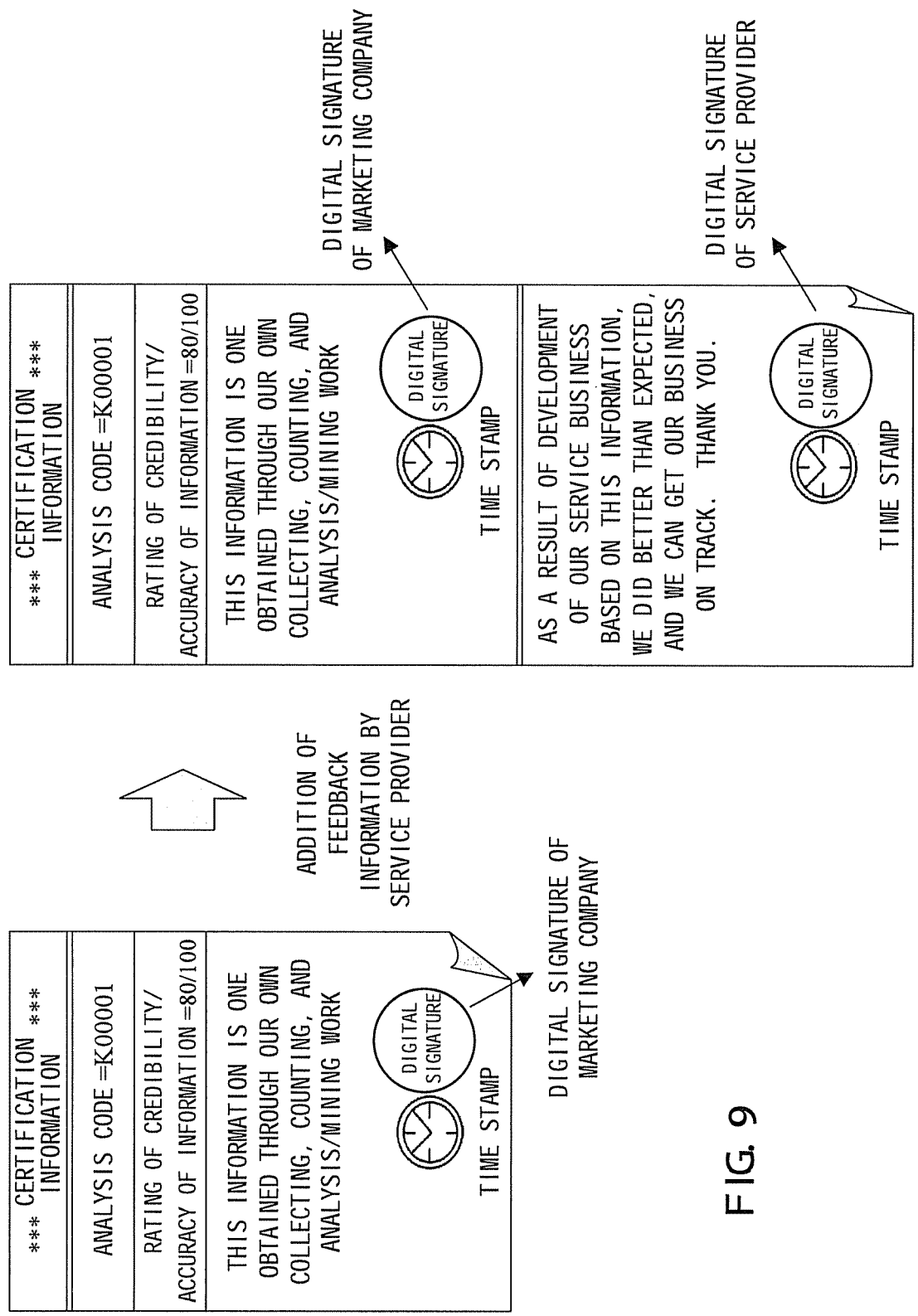
FIG. 9 is an explanatory view showing an example of addition of feedback information to the certification information.

In addition, when a fact that information indicating that this analysis/mining result has an analysis code (=K00001) is not falsified can be confirmed, it is possible to more safely and easily confirm to which analysis/mining result the feedback information corresponds. FIG. 9 shows the addition of the feedback information to the certification information.

As a technique capable of meeting the above requirements, there is disclosed an invention titled "Digital document management system, digital document management method, and digital document management program" (PCT/JP05/00827). By using this technique, a third-party certification concerning "When, by whom, for which part of which information, and how an addition, correction, or the like has been made" can be achieved. That is, even when one adds information to digital data with digital signature/time stamp created by other person, a fact that the one has added information to only his or her responsible part and has not made any alteration on a part that the other person has created can be proved to a third party. By aggressively employing such a technique, information exchange can be performed in B2B, B2C, or the like with security based on confidential relationship.

The feedback information is received by the I/O controller 20 of the information collection/analysis section 10 provided in the marketing company and is sent to the contractor evaluation section 80 through the processing controller 30. The contractor evaluation section 80 performs evaluation of the information provider 100 (contractor) based on the received feedback information (step ST-9). Hereinafter, concrete operation of the evaluation processing will be described.

As a first step, the feedback information from the service provider 200 and information provider 100 are associated with each other. Concretely, the contractor evaluation section 80 confirms the analysis code (=K00001) written in the certification information received from the service provider 200. Then, the contractor evaluation section 80 searches the analysis information management TB 72 of the analysis information management section 70 using the analysis code (=K00001) as a key.

In the present embodiment, the analysis code (=K00001) in FIG. 7 is hit and, at the same time, entry information: classification name=travel; contractor code (information code) (=N00001 (I00A, I00B), N00005 (I00H) . . . ) can be referred to. Then, using the contractor code (information code) (=N00001, N00005 . . . ) as a search key, the contractor evaluation section 80 searches the contractor information management TB 42 of the contractor information management section 40 with reference to contractor code (information code) (=N00001 (I00A, I00B), N00005 (I00H) . . . ).

Further, when the link to the contractor information management DB 41 is followed from the entry information of contractor code (=N00001), a fact that the information of Hanako Suzuki has been utilized can be confirmed. With the above operation, it is possible to easily associate the feedback information from the service provider 200 and information provider 100 with each other.

Next, as a second step, evaluation of the information provider 100 is performed. Since the feedback information from the service provider 200 and information provider 100 can be associated with each other in the first step, the evaluation information of the corresponding information provider 100 (contractor code (=N00001), Hanako Suzuki) recorded in the contractor information management TB 42 may be increased by two points from A05 to A07.

Further, since which collected information of which information provider 100 can be identified in the first step, per-analysis weighting values of corresponding collected information (information code (=I00A, I00B)) of the information provider (contractor code (=N00001), Hanako Suzuki) may be increased by two points, respectively.

Although the evaluation information is increased simply by two points in the present embodiment, another mechanism/method can be employed. For example, the evaluation information may be increased with a constant rate until the point of the evaluation information reaches a predetermined value, and when the point of the evaluation information exceeds the predetermined value, that is, for a highly-evaluated information provider 100, the evaluation information may be increased with a higher rate.

After completion of the evaluation of the information provider 100, a corresponding lump-sum (bonus) is paid to the information provider 100 concerning the feedback information, including Hanako Suzuki (contractor code=N00001), contractor of a contractor code=N00005, and others, (step ST-10). This may result in an increase in the motivation of the information provider 100, leading to enhancement in the frequency of information provision and quality of the content of information.

That is, when the information of the information provider 100 is determined to be useful, he or she can receive a corresponding compensation (basic contract fee+bonus), resulting in an increase in the motivation for information provision. Further, if the marketing company appearing in the present embodiment expands its business and becomes a famous company, credibility thereof may increase. This may increase the number of information providers 100 who make a contract with the marketing company. Further, a fact that a reasonable compensation is paid to the information provider 100 inspires commitment from inexperienced persons. As a result, the number of information providers 100 (contractors) is gradually increased and, thereby, acquisition of unspecified large number of information, which is a theme of the present invention, can be achieved.

Advantages of the present invention for the information provider 100, marketing company, and service provider 200 which are actors appearing in the present embodiment will be described. Advantages for information provider 100 include: to acquire a certain amount of money by providing information to the marketing company (basic contract fee); to acquire a further compensation (bonus) when the provided information is utilized for the analysis/mining processing; and to avoid a problem of a cumbersome management of personal information which has been caused due to contracts with a plurality of service providers 200 or a problem of forcible connection of personal or private information by using an intermediary company, such as marketing company, mediating between the service provider 200 and information provider 100.

Advantages for the marketing company include: to collect an information collection/marketing fee from the service provider 200; and to easily find a talented information provider 100 to thereby secure the necessary personnel for marketing activity. Further, there may be a case where the marketing company hires the information provider 100 as a regular employee (specialist personnel). Further, there is possibility that a new business is created where the marketing company introduces the information provider 100 to the service provider 200 with the consent of the information provider 100 and collects a commission from the service provider 200.

Advantages for the service provider 200 include: to acquire unspecified large number of information without troublesome work only by paying information collection/marketing fee; to eliminate the need to incur the cost associated with high-end and complicated mining processing, facilities, employee training, and accumulation of know-how for such mining processing; and to eliminate the need to perform management of the personal or private information of the information provider 100.

INDUSTRIAL APPLICABILITY

According to the present invention, it is possible for the service provider to efficiently collect and accumulate unspecified large number of information as much as possible for marketing activities and to make use of the information without collecting and accumulating personal or private information of an information provider.

The invention claimed is:

1. A non-transitory computer-readable medium having stored thereon an information collection program for causing a computer that includes an information provider management table, a collected information management table and an analysis information management table, to execute a process comprising:

receiving information provided from an information provider recorded in the information provider management table;

managing the information received in the receiving in association with the information provider after recording the received information with an information code and a weighting point assigned to the received information into the collected information management table, the weighting point indicating a per-analysis weighting value;

receiving an information analysis request requesting an analysis of the information managed by the managing from a service provider;

analyzing the information managed in the managing based on the information analysis request so as to generate an analysis result and to update the weighting point;

managing the information analyzed in the analyzing in association with the service provider, by recording the analysis result with an analysis code in association with the information code and an information provider code of the information provider who provides the information into the analysis information management table, so as to transmit the analyzed information to the service provider and to determine whether or not to transmit the analyzed information to another service provider according to a rule when a similar request is made from the another service provider, the rule defining whether or not the analyzed information is allowed to be provide to another service provider except the service provider;

receiving evaluation based on a result of utilizing the analyzed information as feedback information from the service provider; and giving an evaluation point to the information provider or the provided information based on the feedback information received in the receiving evaluation, wherein the managing the information analyzed calculates a rating of accuracy based on the weighting point and the evaluation and transmits the analyzed information with the rating of accuracy to the service provider; and wherein the managing the information analyzed in the analyzing manages the provided information by linking the analysis code corresponding to the classification of the provided information, a classification name, the information provider code, the information code corresponding to the provided information of the information provider, and the analysis result to each other, by using the analysis information management table.

2. The non-transitory computer-readable medium according to claim 1, wherein each of the managing the information received in the receiving and the managing the information analyzed in the analyzing, includes:

adding falsification detection information to the provided information and analysis information managed therein for preventing a falsification; and encrypting the provided information and analysis information managed therein for preventing an intercept.

3. The non-transitory computer-readable medium according to claim 1, wherein the process further comprises managing the personal information of the information provider by recording the personal information into the information provider management table, and the personal information managed in the managing the personal information includes evaluation information of the information provider which is based on the feedback information.

4. The non-transitory computer-readable medium according to claim 1, wherein the analyzing increases the weighting point when the provided information is used for analysis performed in the analyzing.

5. The non-transitory computer-readable medium according to claim 1, wherein the process further comprises adding, when transmitting information analyzed in the analyzing to the service provider, predetermined certification information for certifying the publisher of the analysis information.

6. The non-transitory computer-readable medium according to claim 5, wherein the certification information includes a digital signature and a time stamp attached to the digital signature.

7. The non-transitory computer-readable medium according to claim 5, wherein the receiving evaluation receives feedback information which has been added to the analysis information including the certification information transmitted in the adding together with a digital signature and a time stamp added to the feedback information by the service provider.

8. An information collection apparatus for collecting information, comprising:

a memory including an information provider management table, a collected information management table and an analysis information management table; and a processor coupled to the memory, wherein the processor is programmed to execute a process comprising:

receiving information provided from an information provider recorded in the information provider management table;

managing the information received in the receiving in association with the information provider after recording the received information with an information code and a weighting point assigned to the received information into the collected information management table, the weighting point indicating a per-analysis weighting value;

receiving an information analysis request requesting an analysis of the information managed by the managing from a service provider;

analyzing the information managed in the managing based on the information analysis request so as to generate an analysis result and to update the weighting point;

managing the information analyzed in the analyzing in association with the service provider, by recording the analysis result with an analysis code in association with the information code and an information provider code of the information provider who provides the information into the analysis information management table, so as to transmit the analyzed information to the service provider and to determine whether or not to transmit the analyzed information to another service provider according to a rule when a similar request is made from the another service provider, the rule defining whether or not the analyzed information is allowed to be provide to another service provider except the service provider;

receiving evaluation based on a result of utilizing the analyzed information as feedback information from the service provider; and giving an evaluation point to the information provider or the provided information based on the feedback information received in the receiving evaluation, wherein the managing the information analyzed calculates a rating of accuracy based on the weighting point and the evaluation and transmits the analyzed information with the rating of accuracy to the service provider, and wherein the managing the information analysis in the analyzing manages the provided information by linking the analysis code corresponding to the classification of the provided information, a classification name, the information provider code, the information code corresponding to the provided information of the information provider, and the analysis result to each other, by using the analysis information management table.

9. The information collection apparatus according to claim 8, wherein each of the managing the information received in the receiving and the managing the information analyzed in the analyzing, includes:

adding falsification detection information to the provided information and analysis information managed therein for preventing a falsification; and encrypting the provided information and analysis information managed therein for preventing an intercept.

10. The information collection apparatus according to claim 8, wherein the process further comprises managing the personal information of the information provider by recording the personal information into the information provider management table, and the personal information managed in the managing the personal information includes evaluation information of the information provider which is based on the feedback information.

11. The information collection apparatus according to claim 8, wherein the analyzing increases the weighting point when the provided information is used for analysis performed by the analyzing.

12. The information collection apparatus according to claim 8, wherein the process further comprises adding, when transmitting information analyzed in the analyzing to the service provider, predetermined certification information for certifying the publisher of the analysis information.

13. The information collection apparatus according to claim 12, wherein
the certification information includes a digital signature and a time stamp attached to the digital signature.

14. The information collection apparatus according to claim 12, wherein
the receiving evaluation receives feedback information which has been added to the analysis information including the certification information transmitted to the service provider together with a digital signature and a time stamp added to the feedback information by the service provider.

15. An information collection method that is implemented by a computer that includes an information provider management table, a collected information management table and an analysis information management table, the method comprising:
receiving, using a processor, information provided from an information provider recorded in the information provider management table;
managing, using the processor, the information received in the receiving in association with the information provider after recording the received information with an information code and a weighting point assigned to the received information into the collected information management table, the weighting point indicating a per-analysis weighting value;
receiving, using the processor, an information analysis request requesting an analysis of the information managed by the managing from a service provider;
analyzing, using the processor, the information managed in the managing based on the information analysis request so as to generate an analysis result and to update the weighting point;
managing, using the processor, the information analyzed in the analyzing in association with the service provider, by recording the analysis result with an analysis code in association with the information code and an information provider code of the information provider who provides the information into the analysis information management table, so as to transmit the analyzed information to the service provider and to determine whether or not to transmit the analyzed information to another service provider according to a rule when a similar request is made from the another service provider, the rule defining whether or not the analyzed information is allowed to be provide to another service provider except the service provider;
receiving, using the processor, evaluation based on a result of utilizing the analyzed information as feedback information from the service provider; and
giving, using the processor, an evaluation point to the information provider or the provided information based on the feedback information received in the receiving evaluation, wherein
the managing the information analyzed calculates a rating of accuracy based on the weighting point and the evaluation and transmits the analyzed information with the rating of accuracy to the service provider, and
wherein the managing the information analyzed in the analyzing manages the provided information by linking the analysis code corresponding to the classification of the provided information, a classification name, the information provider code, the information code corresponding to the provided information of the information provider, and the analysis result to each other, by using the analysis information management table.

16. The information collection method according to claim 15, wherein
each of the managing the information received in the receiving and the managing the information analyzed in the analyzing, includes:
adding falsification detection information to the provided information and analysis information managed therein for preventing a falsification; and
encrypting the provided information and analysis information managed therein for preventing an intercept.

17. The information collection method according to claim 15, further comprising
managing the personal information of the information provider by recording the personal information into the information provider management table, wherein
the personal information managed in the managing the personal information includes evaluation information of the information provider which is based on the feedback information.

18. The information collection method according to claim 15, wherein
the analyzing increases the weighting point when the provided information is used for analysis performed in the analyzing.

* * * * *